(12) United States Patent
Boerger

(10) Patent No.: US 9,311,304 B2
(45) Date of Patent: Apr. 12, 2016

(54) STORAGE SUBSYSTEM DATA DUPLICATION POLICY

(75) Inventor: Paul Boerger, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 260 days.

(21) Appl. No.: 13/805,592

(22) PCT Filed: Jun. 20, 2010

(86) PCT No.: PCT/US2010/039287
§ 371 (c)(1),
(2), (4) Date: Dec. 19, 2012

(87) PCT Pub. No.: WO2011/162738
PCT Pub. Date: Dec. 29, 2011

(65) Prior Publication Data
US 2013/0097132 A1    Apr. 18, 2013

(51) Int. Cl.
*G06F 17/30* (2006.01)
*G06F 11/20* (2006.01)

(52) U.S. Cl.
CPC ............ *G06F 17/30* (2013.01); *G06F 11/2069* (2013.01); *G06F 17/30073* (2013.01); *G06F 17/30221* (2013.01)

(58) Field of Classification Search
None
See application file for complete search history.

(56) References Cited

U.S. PATENT DOCUMENTS

| 6,026,454 | A  |   | 2/2000  | Hauck et al. |
| 7,509,316 | B2 |   | 3/2009  | Greenblatt et al. |
| 7,511,848 | B2 |   | 3/2009  | Crosier et al. |
| 7,702,948 | B1 | * | 4/2010  | Kalman ............... G06F 3/0605 714/5.1 |
| 2005/0193167 | A1 |   | 9/2005 | Eguchi et al. |
| 2006/0006233 | A1 | * | 1/2006 | Chang et al. .................. 235/441 |
| 2006/0143507 | A1 | * | 6/2006 | Tanaka .............................. 714/6 |
| 2006/0206675 | A1 | * | 9/2006 | Sato et al. ..................... 711/161 |
| 2007/0185934 | A1 | * | 8/2007 | Cannon et al. ................ 707/204 |
| 2009/0132621 | A1 |   | 5/2009 | Jensen |
| 2010/0318737 | A1 | * | 12/2010 | Thomas ............... G06F 3/0619 711/114 |

FOREIGN PATENT DOCUMENTS

CN       1525337 A       9/2004
KR   1020050064278       6/2005

OTHER PUBLICATIONS

WIPO, International Search Report dated Mar. 22, 2011, PCT /US2010/039287 filed Jun. 20, 2010.

* cited by examiner

*Primary Examiner* — Miranda Huang
(74) *Attorney, Agent, or Firm* — Law Office of Michael Dryja

(57) ABSTRACT

A type of a storage subsystem that has been connected to a computing device is detected as one of a number of types including a first type and a second type (602). The first type of storage subsystem has a number of storage devices in which data to be stored on the storage subsystem is duplicated within the storage subsystem itself. The second type of storage subsystem has a number of storage devices in which the data to be stored on the storage subsystem is not duplicated within the storage subsystem itself. A data duplication policy for the storage subsystem is set in accordance with the type that has been determined (608).

11 Claims, 4 Drawing Sheets

STORAGE SUBSYSTEM DATA DUPLICATION POLICY

BACKGROUND

Some types of computing devices, such as server computing devices, include a number of drive bays. A user may insert a storage device, such as a hard disk drive, into a drive bay to connect the storage device to the computing device. As such, data generated by the computing device, or by another computing device, can be stored on the storage devices that have been inserted into the drive bays. To ensure the safety of the data in the situation where a storage device fails, the data stored on each storage device may be duplicated, or backed up, onto other storage devices that have been inserted into other drive bays of the computing device.

DETAILED DESCRIPTION

Figure 1:
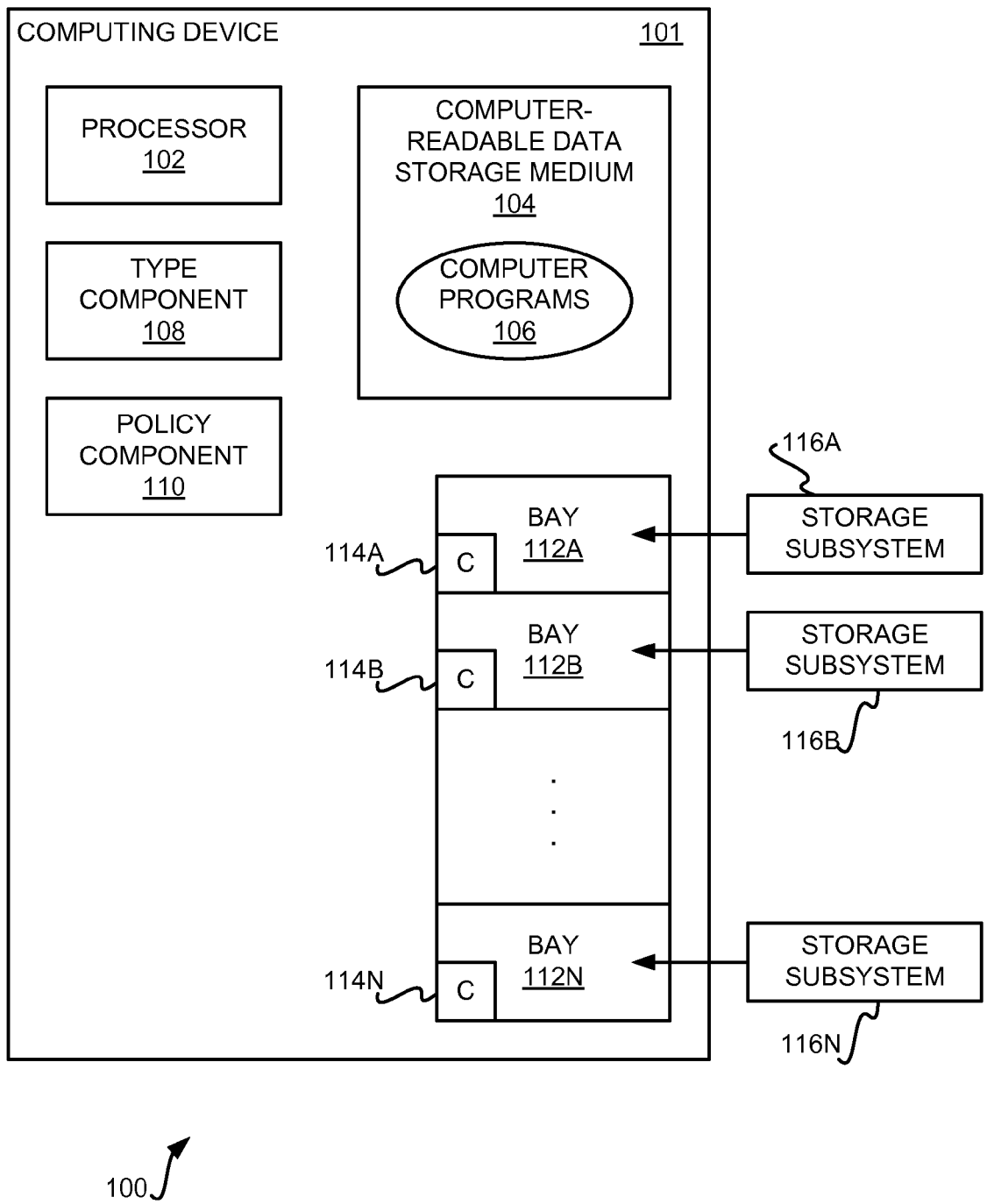
FIG. 1 is a diagram of a system, according to an embodiment of the disclosure.

As noted in the background section, some types of computing devices include drive bays into which a user may insert storage devices to connect the storage devices to the computing device. Conventionally, a drive bay is receptive to a single storage device, which is usually a hard disk drive. For example, a drive bay may be adapted to conform to a particular type of hard disk drive tray. A hard disk drive is installed within the tray, and then the tray is inserted into the drive bay. In this way, the hard disk drive is connected to the computing device.

When such a storage device has been inserted into a drive bay, the computing device typically detects that additional storage has been added, and may set a data duplication policy for the storage device. For example, a user may have originally connected a first storage device to the computing device, and may now be connecting a second storage device to the computing device. The computing device detects the connection of the second storage device, and sets a data duplication policy so that data stored on the first storage device is duplicated to the second storage device.

Computing devices typically assume that a drive bay is receptive to a single storage device. With respect to hard disk drives, for instance, typically a single 3.5-inch hard disk drive is attached to a hard disk drive tray and inserted into a drive bay. More recently, hard disk drive trays have been constructed so that two 2.5-inch hard disk drives can be attached to a hard disk drive tray and inserted into a single drive bay. However, the computing device still typically treats this storage subsystem as a single storage device for the purposes of setting a data duplication policy.

As a result, the data duplication policy may be overly redundant. For example, the two 2.5-inch hard disk drives may themselves be configured so that data stored on one disk drive is automatically duplicated on the other disk drive. When these two hard disk drives are attached to a hard disk drive tray and inserted into a single drive bay, the computing device may nevertheless set a data duplication policy so that the data stored on the hard disk drives is also duplicated onto another storage device inserted into a different drive bay. As such, data is unnecessarily duplicated twice: within the same drive bay and between drive bays.

Furthermore, computing devices typically assume that a drive bay is receptive to a magnetic spindle-type hard disk drive. A magnetic spindle-type hard disk drive includes one or more magnetic platters that are rotated at relatively high speed for data to be written onto and read from the platters. Data stored on such types of hard disk drives are typically duplicated if possible, because magnetic spindle-type hard disk drives have been known to fail. Therefore, when such a hard disk drive is inserted into a drive bay, the computing device may assume that data stored on the hard disk drive should be duplicated, and thus accordingly set an appropriate data duplication policy.

However, more recently high-reliability storage devices have become available, such as solid-state drives that have no moving parts. When such a high-reliability storage device inserted into a drive bay, the computing device typically treats the storage device no differently than a magnetic spindle-type hard disk drive, even though the storage device may be much more reliable. As such, data stored on the high-reliability storage device is duplicated to a storage device that has been inserted into a different drive bay, even though such duplication may be unnecessary.

Embodiments of the disclosure prevent such unnecessary data duplication on storage devices. A computing device detects the type of storage subsystem that has been connected to the computing device, and sets a data duplication policy for the storage subsystem in accordance with its type. For example, if a storage subsystem includes multiple storage devices, the policy may be set so that no further data duplication occurs where the multiple storage devices have already been configured to duplicate data among themselves. Similarly, if a storage subsystem includes a high-reliability storage device, the policy may be set so that no data duplication occurs.

FIG. 1 shows a system 100, according to an embodiment of the disclosure. The system 100 is implemented in FIG. 1 as a computing device 101. The computing device 101 may be a server computing device in one embodiment, which is intended to store data for a number of other computing devices that are referred to as client computing devices. The computing device 101 includes hardware, such as a processor 102, and a computer-readable data storage medium 104 storing one or more computer programs 106. The computer-readable data storage medium 104 may be a volatile data storage medium, such as volatile semiconductor memory, and/or a non-volatile data storage medium, such as a hard disk drive.

The computing device 101 includes a type component 108, and a policy component 110. The components 108 and 110 are said to be implemented by the computer programs 106 stored on the computer-readable data storage medium 104.

That is, execution of the computer programs 106 by the processor 102 results in the functionality of the components 108 and 110 being realized.

The computing device 101 includes a number of bays 112A, 112B, ..., 112N, collectively referred to as the bays 112, as well as a number of connectors 114A, 114B, ..., 114N, collectively referred to as the connectors 114, and which correspond to the bays 112. The bays 112 are receptive to a corresponding number of storage subsystems 116A, 116B, ..., 116N, collectively referred to as the storage subsystems 116. Complete insertion of a storage subsystem 116 into a bay 112 results in the subsystem 116 making electrical contact with a corresponding connector 114, so that the storage subsystem 116 is connected to the computing device 101. The connectors 114 may include serial advanced technology attachment (SATA) connectors, parallel ATA (PATA) connectors, small computer system interface (SCSI) connectors, or other types of connectors.

In one embodiment, the bays 112 may be receptive to storage subsystems 116 that have a 3.5-inch form factor. As such, a 3.5-inch storage device, such as a 3.5-inch hard disk drive, may be inserted as a storage subsystem 116 into a bay 112. As another example, two 2.5-inch storage devices, such as two 2.5-inch hard disk drives, may be attached to a housing or tray having a 3.5-inch form factor, and this resulting storage subsystem 116 inserted into a bay 112.

In another embodiment, the bays 112 may be receptive to storage subsystem 116 that have a 5.25-inch form factor. As such, a 3.5-inch storage device, such as a 3.5-inch hard disk drive, may be attached to a housing or tray having a 5.25-inch form factor, and this resulting storage subsystem 116 inserted into a bay 112. As another example, two 2.5-inch storage devices, such as two 2.5-inch hard disk drives, may be attached to a housing or tray having a 5.25-inch form factor, and this resulting storage subsystem 116 inserted into a bay 112.

Upon connection of a storage subsystem 116 to a connector 114 via insertion of the subsystem 116 into a corresponding bay 112, the type component 108 detects the type of the subsystem 116. For example, there may be at least four different storage subsystem types. The first subsystem type may be a storage subsystem 116 having multiple storage devices on which data to be stored on the subsystem 116 is duplicated within this storage subsystem 116. The second subsystem type may be a storage subsystem 116 having multiple devices on which data to be stored on the subsystem 116 is not duplicated within this storage subsystem 116. The third type may be a storage subsystem 116 having a single high-reliability storage device, such as a solid-state drive (SSD) having no moving parts. The fourth type may be a storage subsystem 116 having a single conventional storage device, such as a magnetic spindle-type hard disk drive having one or more magnetic platters that are rotated at relatively high speed.

Once the type component 108 detects the type of the storage subsystem 116 that has been inserted into a bay 112 and that has made connection with a corresponding connector 114, the policy component 110 sets a data duplication policy for data to be stored on the subsystem 116. Generally, there are two data duplication policies: either data stored on the subsystem 116 in question is duplicated on another storage subsystem 116 inserted into a different bay 112, or data stored on the subsystem 116 in question is not duplicated on another subsystem 116 inserted into a different bay 112. The data duplication policy can be set automatically by the policy component 110 upon the type component 108 detecting the type of the storage subsystem 116 that has been connected to a connector 114, without any user interaction.

FIGS. 2, 3, 4, and 5 show data duplication policies for different types of storage subsystems 116, according to varying embodiments of the disclosure. In FIGS. 2, 3, 4, and 5, two representative bays 112A and 112B and two representative storage subsystems 116A and 116B are depicted. The storage subsystem 116A, which includes a storage device 202, has already been inserted into the bay 112A. The storage subsystem 116B is being inserted into the bay 112B. The data duplication policies of FIGS. 2, 3, 4, and 5 are set by the policy component 110 once the storage subsystem 116B has been inserted into the bay 112B, and the type component 108 has detected the type of the subsystem 116B.

Figure 2:
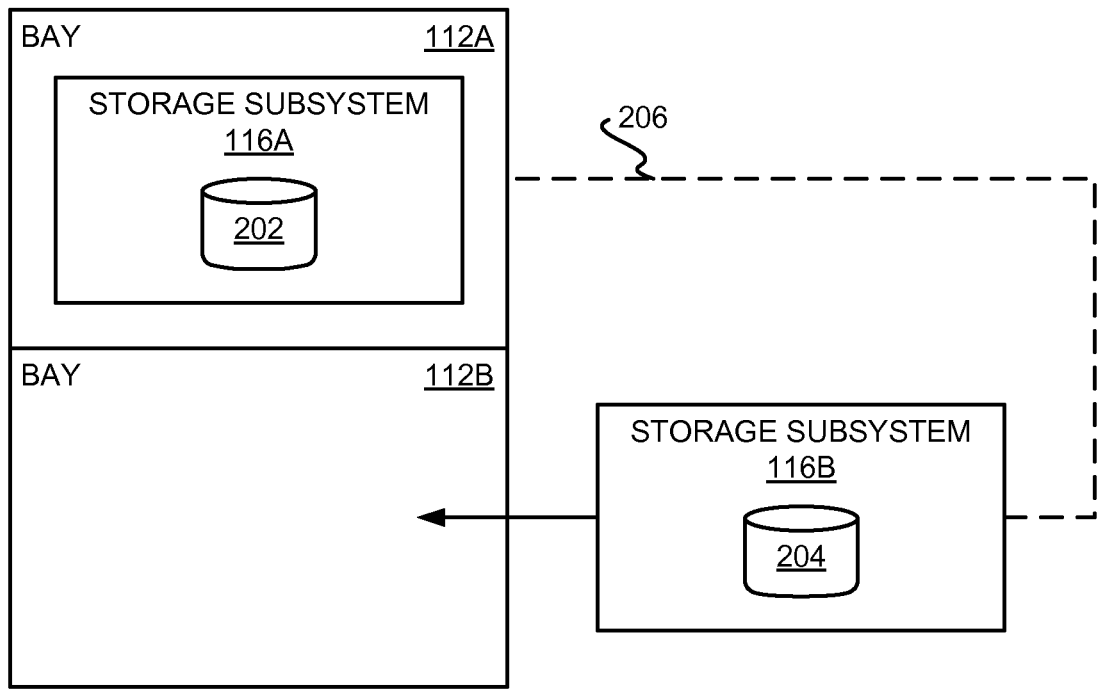
FIG. 2 is a diagram of a data duplication policy for a storage subsystem having a single conventional storage device, according to an embodiment of the disclosure.

In FIG. 2, the storage subsystem 116B includes a single conventional storage device 204, such as a magnetic spindle-type hard disk drive having one or more magnetic platters that are rotated at relatively high speed. The type component 108 detects that the storage subsystem 116B includes a single conventional storage device 204, and provides this information to the policy component 110. In response, the policy component 110 specifies a duplication policy so that data to be stored on the storage subsystem 116B is also stored (i.e., duplicated) on the storage subsystem 116A, as indicated by the dashed line 206. For example, the data already stored on the storage subsystem 116A is copied to the storage subsystem 116B, and/or data that is to be stored on the subsystem 116B is also copied to the subsystem 116A.

Figure 3:
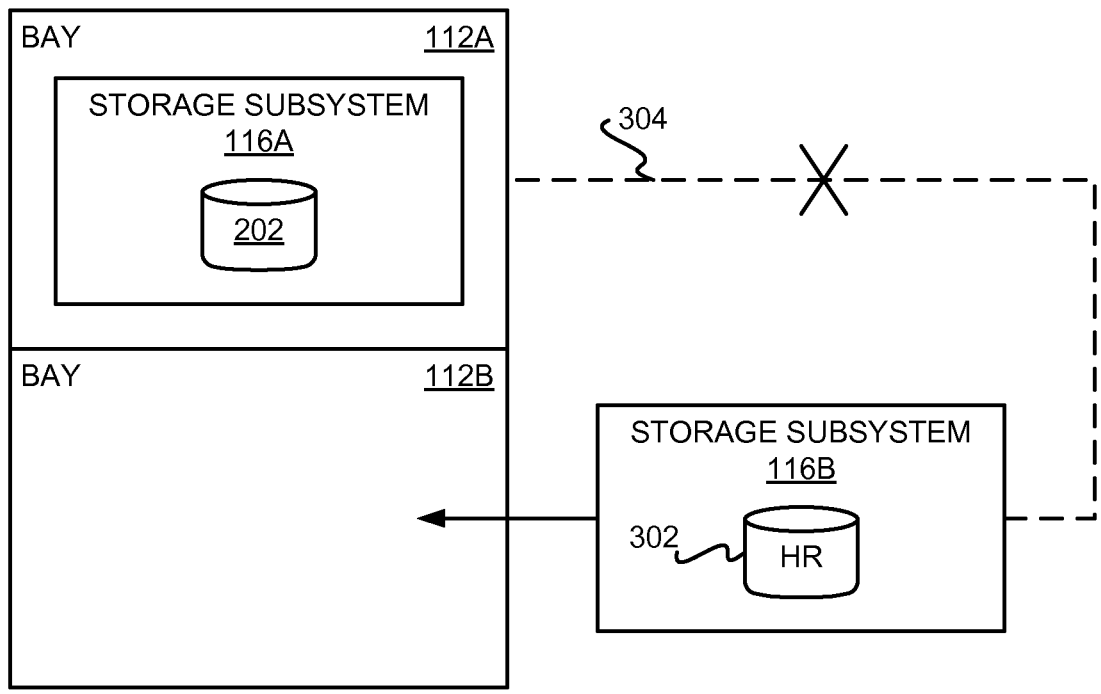
FIG. 3 is a diagram of a data duplication policy for a storage subsystem having two storage devices in which data stored on the storage subsystem is duplicated within the storage subsystem itself, according to an embodiment of the disclosure.

In FIG. 3, the storage subsystem 116B includes a high-reliability storage device 302, such as an SSD that has no moving parts. The type component 108 detects that the storage subsystem 116B includes a high-reliability storage device 302, and provides this information to the policy component 110. In response, the policy component 110 specifies a duplication policy so that data to be stored on the storage subsystem 116B is not stored (i.e., duplicated) on the storage subsystem 116A, as indicated by the X-ed dashed line 304. For example, the data already stored on the storage subsystem 116A is not copied to the storage subsystem 116B, and the data that is to be stored on the subsystem 116B is not copied to the subsystem 116A.

Figure 4:
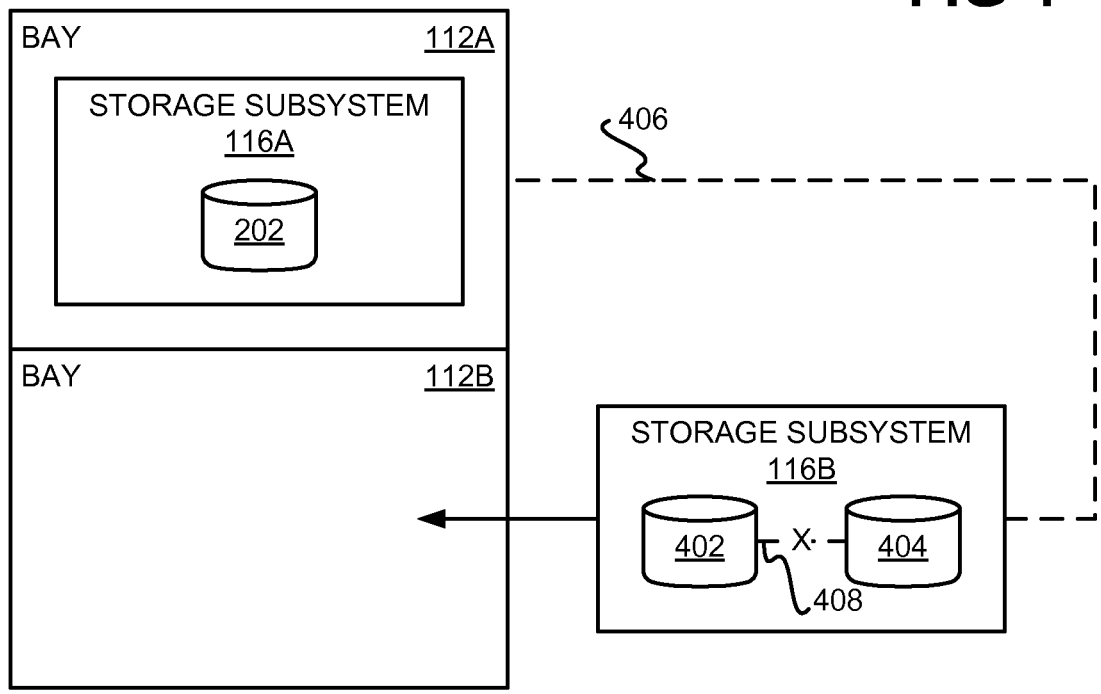
FIG. 4 is a diagram of a data duplication policy for a storage subsystem having two storage devices in which data stored on the storage subsystem is not duplicated within the storage subsystem itself, according to an embodiment of the disclosure.

In FIG. 4, the storage subsystem 116B includes two storage devices 402 and 404. Data to be stored within the storage subsystem 116B is not duplicated within the subsystem 116B itself, as indicated by the X-ed dashed line 408. That is, data stored on the storage device 402 is not also stored on the storage device 404. For example, the storage devices 402 and 404 may be configured in accordance with a redundant array of independent disks (RAID)-0 technique, in which data is striped across the devices 402 and 404 as a single logical storage volume. As another example, the storage devices 402 and 404 may be configured in accordance with a just a bunch of disks (JBOD) technique, in which each device 402 and 404 is its own separate logical storage volume. As a third example, the storage devices 402 and 404 may be configured in accordance with a spanning technique, in which a single logical storage volume spans both the devices 402 and 404.

The type component 108 detects that the storage subsystem 116B includes two storage devices 402 and 404, and the configuration of the two devices 402 and 404 in accordance with a technique that does not store duplicate data between the storage devices 402 and 404. The type component 108 provides this information to the policy component 110. In response, the policy component 110 specifies a duplication policy so that data to be stored on the storage subsystem 116B is also stored (i.e., duplicated) on the storage subsystem 116A, as indicated by the dashed line 406. For example, the data already stored on the storage subsystem 116A is copied to the storage subsystem 116B, and/or data that is to be stored on the subsystem 116B is also copied to the subsystem 116A.

Figure 5:
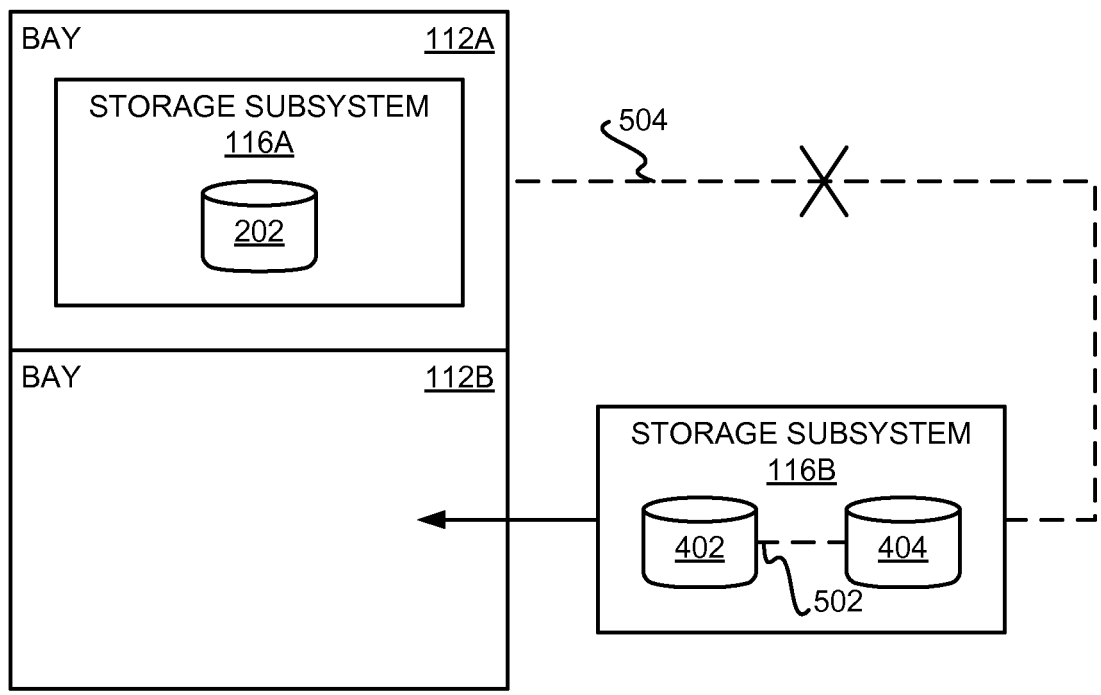
FIG. 5 is a diagram of a data duplication policy for a storage subsystem having a single high-reliability storage device, according to an embodiment of the disclosure.

In FIG. 5, the storage subsystem 116B again includes two storage devices 402 and 404. However, data to be stored within the storage subsystem 116B is duplicated within the subsystem 116B itself, as indicated by the dashed line 502. That is, data stored on the storage device 402 is also stored on the storage device 404. For example, the storage devices 402 and 404 may be configured in accordance with a RAID-1 technique, in which data is mirrored to both the devices 402 and 404 as a single storage volume.

The type component 108 detects that the storage subsystem 116B includes two storage devices 402 and 404, and the configuration of the two devices 402 and 404 in accordance with a technique that does store duplicate data between the storage devices 402 and 404. The type component 108 provides this information to the policy component 110. In response, the policy component 110 specifies a duplication policy so that data to be stored on the storage subsystem 116B is not stored (i.e., duplicated) on the storage subsystem 116A, as indicated by the X-ed dashed line 504. For example, the data already stored on the storage subsystem 116A is not copied to the storage subsystem 116B, and/or data that is to be stored on the subsystem 116B is not copied to the subsystem 116A.

Figure 6:
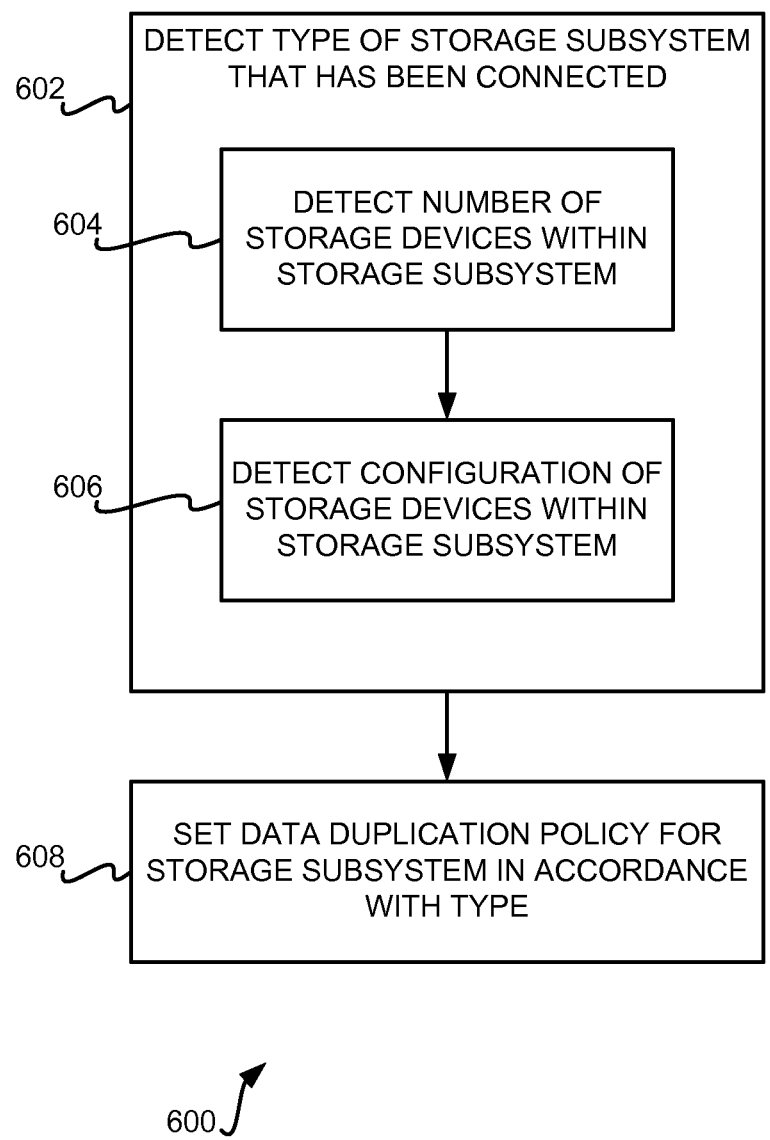
FIG. 6 is a flowchart of a method, according to an embodiment of the disclosure.

FIG. 6 shows a method 600, according to an embodiment of the disclosure. The method 600 is performed by the computing device 101 of the system 100. More specifically, parts 602, 604, and 606 of the method 600 are performed by the type component 108, whereas part 608 is performed by the policy component 110. The method 600 may thus be implemented by the computer programs 106 stored on the computer-readable data storage medium 104, where execution of the computer programs 106 by the processor 102 causes the method 600 to be performed.

Responsive to a storage subsystem 116 being connected to the computing device 101, the type of the storage subsystem 116 is detected (602). For example, the storage subsystem 116 may include a single conventional storage device, or a single high-reliability storage device. When the storage subsystem 116 includes a single storage device, whether the storage device is a high-reliability storage device or not is detected. As another example, the storage subsystem 116 may include multiple storage devices.

In this latter example, the type of the storage subsystem 116 can be detected by detecting the number of storage devices within the storage subsystem 116 (604), and where there are multiple storage devices, detecting the configuration of the storage devices (606). For example, the storage devices may be configured so that data to be stored on the storage subsystem 116 is duplicated within the subsystem 116 itself. As another example, the storage devices may be configured so that such data is not duplicated within the subsystem 116 itself.

Once the type of the storage subsystem 116 has been detected, a data duplication policy is set for the subsystem 116 in accordance with the type of the subsystem 116 (608). The data duplication policy may be set as has been described above in relation to FIGS. 2, 3, 4, and 5. As such, if the storage subsystem 116 includes a single conventional storage device, then the data duplication policy may be to duplicate the data to be stored on the storage device to another subsystem 116 as well. By comparison, if the storage subsystem 116 includes a single high-reliability storage device, then the data duplication policy may be to not duplicate such data to another subsystem 116.

If the storage subsystem 116 includes multiple storage devices, then the data duplication policy is dependent on how the storage devices are configured within the subsystem 116. For example, if the storage devices are configured so that data to be stored on one storage device is duplicated to another storage device within the storage subsystem 116, then the data deduplication policy may be to not also duplicate this data to any other subsystem 116. By comparison, if the storage devices are configured so that data to be stored on one storage device is not duplicated to another storage device within the storage subsystem 116, then the data duplication may be to duplicate this data to another subsystem 116 as well.

Therefore, embodiments of the disclosure prevent unnecessary duplication of data. If a storage subsystem 116 itself already provides for duplication of data within the subsystem 116, then the computing device 101 does not also duplicate the data to another storage subsystem 116 connected to the computing device 101. By comparison, if a storage subsystem 116 does not already provide for duplication of data within the subsystem 116 itself, then the computing device 101 duplicates the data to another storage subsystem 116 connected to the computing device 101.

I claim:

1. A method comprising:
   detecting a new connection of a storage subsystem to a computing device, wherein the storage subsystem comprises a single independent drive or a plurality of drives that form a single logical unit to the computing device, wherein data from the computing device has yet to be written to the storage subsystem;
   upon making a determination that the storage subsystem is of a first type in which data to be stored on the storage subsystem is duplicated within the storage subsystem itself, setting a data duplication policy to specify that data written to the storage subsystem is not to be duplicated automatically to another storage subsystem connected to the computing device; and
   upon making a determination that the storage subsystem is of a second type in which the data to be stored on the storage subsystem is not duplicated within the storage subsystem itself, setting the data duplication policy to specify that data written to the storage subsystem is to be duplicated automatically to another storage subsystem connected to the computing device.

2. The method of claim 1, further comprising:
   upon making a determination that the storage subsystem is a high-reliability storage device, setting the data duplication policy to specify that data written to the storage subsystem is not to be duplicated automatically to another storage device connected to the computing device.

3. The method of claim 2, wherein the high-reliability storage device is a solid-state storage device having no moving parts.

4. The method of claim 1, wherein making the determination of the type of the storage subsystem that has been connected to the computing device comprises:
   detecting a number of storage devices within the storage subsystem; and,
   detecting a configuration of the storage devices within the storage subsystem,
   wherein the type of the storage subsystem encompasses the number and the configuration of the storage devices within the storage subsystem.

5. The method of claim 1, wherein making the determination of the type of the storage subsystem that has been connected to the computing device comprises detecting the type of the storage subsystem that has been inserted into an empty bay of the computing device.

6. A system comprising:
a processor;
a computer-readable data storage medium-having one or more computer programs stored thereon for execution by the processor;
a plurality of connectors, each connector receptive to connection of a storage subsystem;
a first component implemented by the computer programs to detect a new connection of a given storage subsystem, wherein the storage subsystem comprises a single independent drive or a plurality of drives that form a single logical unit to the computing device, wherein data from within the system has yet to be written to the storage subsystem; and
a second component implemented by the computer programs to:
  upon making a determination that the storage subsystem is of a first type in which data to be stored on the storage subsystem is duplicated within the storage subsystem itself, set a data duplication policy to specify that data written to the storage subsystem is not to be duplicated automatically to another storage subsystem connected to one of the plurality of connectors; and
  upon making a determination that the storage subsystem is of a second type in which the data to be stored on the storage subsystem is not duplicated within the storage subsystem itself, set the data duplication policy to specify that data written to the storage subsystem is to be duplicated automatically to another storage subsystem connected to one of the plurality of connectors.

7. The system of claim 6, wherein the second component further:
upon making a determination that the storage subsystem is a high-reliability storage device, sets the data duplication policy to specify that data written to storage subsystem is not to be duplicated automatically to another storage device connected to one of the plurality of connectors.

8. The system of claim 6, wherein the first component is to detect the type of the given storage subsystem that has been connected to the computing device by:

detecting a number of storage devices within the given storage subsystem; and,
detecting a configuration of the storage devices within the given storage subsystem,
wherein the type of the given storage subsystem encompasses the number and the configuration of the storage devices within the given storage subsystem.

9. The system of claim 6, further comprising:
a plurality of bays corresponding to the plurality of connectors, each bay receptive to insertion of a storage subsystem into the bay such that the storage subsystem becomes connected to the connector corresponding to the bay upon complete insertion of the storage subsystem into the bay.

10. A non-transitory computer-readable storage medium that stores instructions, executable by one or more processors, to cause the one or more processors to perform operations that comprise:
detecting a new connection of a storage subsystem to the computing device, wherein data from the computing device has to be written to the storage subsystem;
upon making a determination that the storage subsystem is of a first type in which data to be stored on the storage subsystem is duplicated within the storage subsystem itself, setting a data duplication policy to specify that data written to the storage subsystem is not to be duplicated automatically to another storage subsystem connected to the computing device; and
upon making a determination that the storage subsystem is of a second type in which the data to be stored on the storage subsystem is not duplicated within the storage subsystem itself, setting the data duplication policy to specify that data written to the storage subsystem is to be duplicated automatically to another storage subsystem connected to the computing device.

11. The non-transitory computer-readable storage medium of claim 10, further comprising:
upon making a determination that the storage subsystem is a high-reliability storage device, setting the data duplication policy to specify that the data written to the storage subsystem is not to be duplicated automatically to another storage device connected to the computing device.

* * * * *